United States Patent
Isozu et al.

(10) Patent No.: US 8,837,919 B2
(45) Date of Patent: Sep. 16, 2014

(54) INFORMATION PROCESSING APPARATUS, INFORMATION PROCESSING METHOD, AND PROGRAM

(75) Inventors: Masaaki Isozu, Tokyo (JP); Takehiko Sasaki, Kanagawa (JP); Kazuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 53 days.

(21) Appl. No.: 13/291,543

(22) Filed: Nov. 8, 2011

(65) Prior Publication Data

US 2012/0141088 A1 Jun. 7, 2012

(30) Foreign Application Priority Data

Dec. 7, 2010 (JP) ................ P2010-272929

(51) Int. Cl.

| | |
|---|---|
| H04N 5/783 | (2006.01) |
| H04N 21/431 | (2011.01) |
| H04N 5/76 | (2006.01) |
| G11B 27/034 | (2006.01) |
| H04N 21/432 | (2011.01) |
| G11B 27/34 | (2006.01) |
| G11B 27/00 | (2006.01) |
| G11B 27/10 | (2006.01) |
| H04N 21/4402 | (2011.01) |

(52) U.S. Cl.
CPC ......... *H04N 21/431* (2013.01); *H04N 21/4325* (2013.01); *G11B 27/34* (2013.01); *G11B 27/005* (2013.01); *G11B 27/105* (2013.01); *H04N 21/440281* (2013.01); *H04N 5/783* (2013.01)
USPC .......................................... 386/343; 386/344

(58) Field of Classification Search
CPC ............ H04N 5/76; H04N 5/783; H04N 9/80
USPC .................................................. 386/343–344
See application file for complete search history.

(56) References Cited

U.S. PATENT DOCUMENTS

| | | | |
|---|---|---|---|
| 6,147,703 A * | 11/2000 | Miller et al. | 348/220.1 |
| 8,285,114 B2 * | 10/2012 | Momosaki | 386/241 |
| 2004/0128317 A1 | 7/2004 | Sull et al. | |
| 2005/0044489 A1 * | 2/2005 | Yamagami et al. | 715/517 |

(Continued)

FOREIGN PATENT DOCUMENTS

| | | |
|---|---|---|
| EP | 1 806 920 A1 | 7/2007 |
| EP | 2 161 722 A1 | 3/2010 |
| JP | 2001-211408 | 8/2001 |
| JP | 2007-89012 A | 4/2007 |

OTHER PUBLICATIONS

Extended European Search Report issued Mar. 19, 2012 in patent application No. 11190408.2.

*Primary Examiner* — Gelek W Topgyal
(74) *Attorney, Agent, or Firm* — Oblon, Spivak, McClelland, Maier & Neustadt, L.L.P.

(57) ABSTRACT

An information processing apparatus that includes a processor that reproduces video data, and an interface that receives an instruction to perform a fast forward operation or a rewind operation on the reproduced video data. The processor, upon receiving the instruction, controls a display to display a first line of thumbnail images each corresponding to a frame of the video data selected at a first time interval, and subsequently controls the display to display a second line of thumbnail images each corresponding to a frame of the video data selected at a second time interval.

21 Claims, 15 Drawing Sheets

(56) References Cited

U.S. PATENT DOCUMENTS

| | | | |
|---|---|---|---|
| 2006/0080716 A1* | 4/2006 | Nishikawa et al. | 725/89 |
| 2007/0071413 A1* | 3/2007 | Takahashi et al. | 386/96 |
| 2008/0063357 A1 | 3/2008 | Kunieda et al. | |
| 2009/0154898 A1* | 6/2009 | Barrett et al. | 386/124 |
| 2009/0172543 A1* | 7/2009 | Cronin et al. | 715/721 |
| 2010/0053096 A1 | 3/2010 | Son | |
| 2010/0083115 A1* | 4/2010 | Park | 715/721 |
| 2010/0115469 A1* | 5/2010 | Shigemori | 715/838 |
| 2010/0175088 A1* | 7/2010 | Loebig et al. | 725/40 |
| 2011/0197131 A1* | 8/2011 | Duffin et al. | 715/720 |

* cited by examiner

| Content ID | Content name | File name | Time stamp |
|---|---|---|---|
| 1 | X Park | Park001.png | 2010-08-16 13:00:05 |
| 1 | X Park | Park002.png | 2010-08-16 13:00:06 |
| 1 | X Park | Park003.png | 2010-08-16 13:00:05 |
| 1 | X Park | Park004.png | 2010-08-16 13:00:07 |
| 1 | X Park | Park005.png | 2010-08-16 13:00:08 |
| 1 | X Park | Park006.png | 2010-08-16 13:00:09 |
| ... | ... | ... | ... |
| 2 | Travel to Y | Travel010.png | 2010-08-16 10:10:09 |
| 2 | Travel to Y | Travel011.png | 2010-08-16 10:10:10 |
| 2 | Travel to Y | Travel012.png | 2010-08-16 10:10:11 |
| ... | ... | ... | ... |

FIG.3

INFORMATION PROCESSING APPARATUS, INFORMATION PROCESSING METHOD, AND PROGRAM

BACKGROUND

The present disclosure relates to an information processing apparatus capable of reproducing video content, and an information processing method and a program for the information processing apparatus.

In the past, in the case where a user views video content in an information processing apparatus such as a television, a video recorder, or a PC (Personal Computer), the user has skipped unnecessary scenes or searched for a desired scene through a button operation of a remote controller or the like. For example, when the user is viewing video content in a general video recorder and an unnecessary scene is started, the user can skip the unnecessary scene by continuing to press a fast-forward button of a remote controller. Further, in the case where the remote controller includes a button for skip for a certain period of time such as 15 seconds or 30 seconds, the user can skip viewing corresponding to those lengths of time by pressing those buttons.

In such a technique, however, the user can hardly grasp when the unnecessary scene ends and accordingly fast-forwarding proceeds beyond necessity in some cases.

Japanese Patent Application Laid-open No. 2001-211408 (hereinafter, referred to as Patent Document 1) discloses the following technique. A digital camera in a standby state of movie reproduction enters a fast-forward mode by long press of a right arrow key of arrow keys. A plurality of thumbnails are displayed on the bottom portion of a screen of a liquid crystal monitor. While a user is pressing the right arrow key, thumbnail images are automatically and sequentially displayed in the order of file numbers while being moved from the left to the right of the screen. When a desired image comes to the center position, the user removes the finger from the right arrow key, and after a predetermined period of time elapses, the mode shifts to a reproduction mode of the image at the center.

SUMMARY

However, in the technique disclosed in Patent Document 1, the number of thumbnails and a time range for displaying at the same time on a screen are limited. Therefore, when a desired scene is distant from a time point at which an arrow key has been pressed, for example, it takes time for the user to reach the desired scene.

In view of the circumstances as described above, it is desirable to provide an information processing apparatus, an information processing method, and a program that are capable of quickly and correctly retrieving a scene desired by a user when a fast-forward/rewind operation for video data is performed.

According to a first exemplary embodiment, the disclosure is directed to an information processing apparatus that includes a processor that reproduces video data, and an interface that receives an instruction to perform a fast forward operation or a rewind operation on the reproduced video data. The processor, upon receiving the instruction, controls a display to display a first line of thumbnail images each corresponding to a frame of the video data selected at a first time interval, and subsequently controls the display to display a second line of thumbnail images each corresponding to a frame of the video data selected at a second time interval.

According to another exemplary embodiment, the disclosure is directed to an information processing method performed by an information processing apparatus. The method includes reproducing video data by a processor of the information processing apparatus, receiving, at an interface of the information processing apparatus, an instruction to perform a fast forward operation or a rewind operation on the reproduced video data, and controlling, by the processor, upon receiving the instruction, a display to display a first line of thumbnail images each corresponding to a frame of the video data selected at a first time interval, and subsequently controlling the display to display a second line of thumbnail images each corresponding to a frame of the video data selected at a second time interval.

According to another exemplary embodiment, the disclosure is directed to a non-transitory computer-readable medium including computer program instructions, which when executed by an information processing apparatus, cause the information processing apparatus to perform a method comprising: reproducing video data; receiving an instruction to perform a fast forward operation or a rewind operation on the reproduced video data; and controlling, upon receiving the instruction, a display to display a first line of thumbnail images each corresponding to a frame of the video data selected at a first time interval, and subsequently controlling the display to display a second line of thumbnail images each corresponding to a frame of the video data selected at a second time interval.

As described above, according to the embodiments of the present disclosure, it is possible to quickly and correctly retrieve a scene desired by a user when a fast-forward/rewind operation for video data is performed.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 3 is a diagram showing an example of a database of information on thumbnails included in the PVR according to the first embodiment of the present disclosure;

FIG. 7 is a diagram showing a state where a database of thumbnails in the processing of FIG. 6 is referred to;

DETAILED DESCRIPTION OF EMBODIMENTS

Hereinafter, embodiments of the present disclosure will be described with reference to the drawings.

First Embodiment

First, as a first embodiment of the present disclosure, an example in which the present disclosure is applied to a PVR (Personal Video Recorder) will be described.

[Hardware Configuration of PVR]

Figure 1:
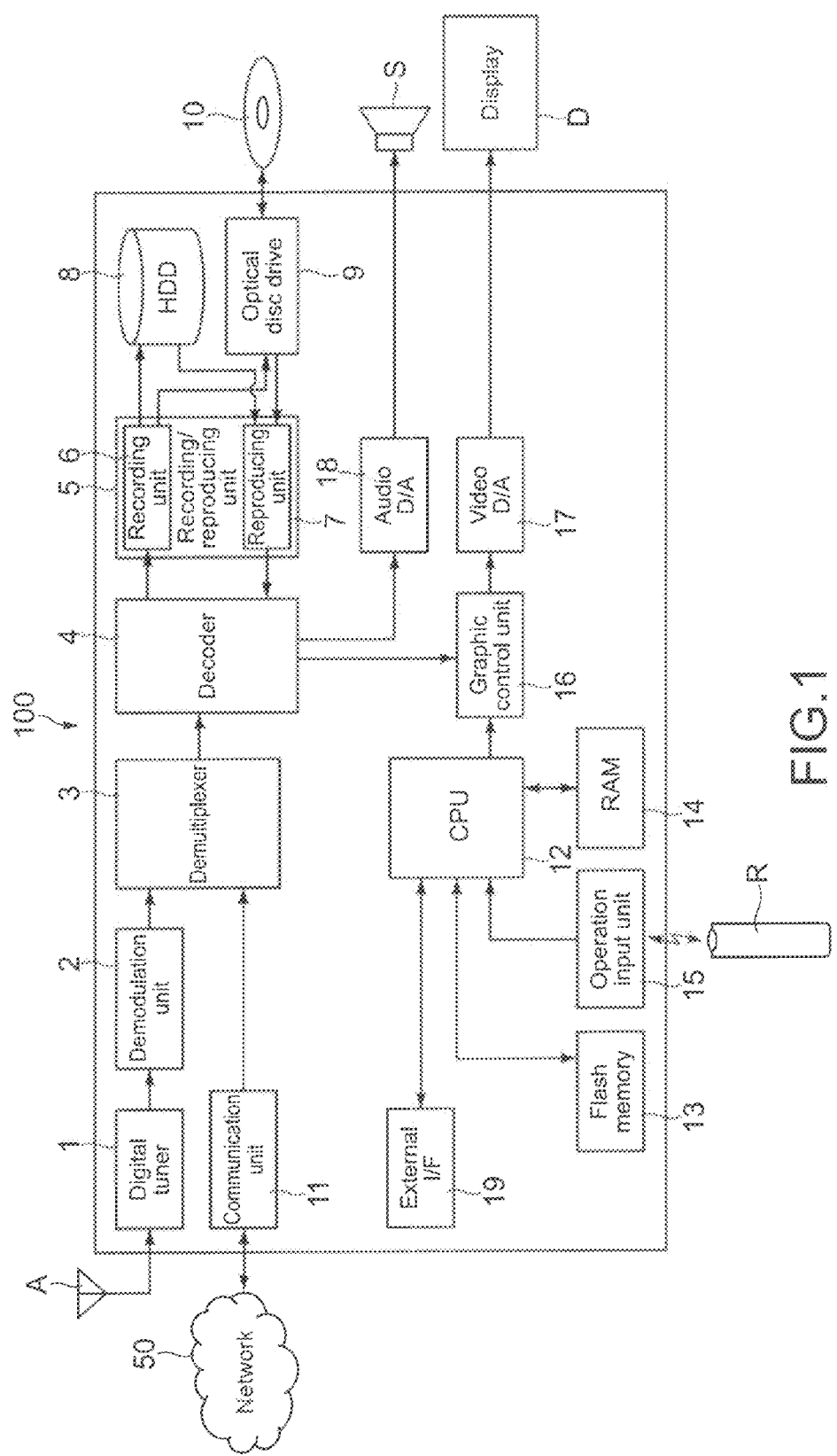
FIG. 1 is a block diagram showing the hardware configuration of a PVR (Personal Video Recorder) according to a first embodiment of the present disclosure.

FIG. 1 is a block diagram showing the hardware configuration of a PVR according to this embodiment.

As shown in FIG. 1, a PVR 100 of this embodiment includes a digital tuner 1, a demodulation unit 2, a demultiplexer 3, a decoder 4, a recording/reproducing unit 5, an HDD (Hard Disk Drive) 8, an optical disc drive 9, and a communication unit 11. Further, the PVR 100 includes a CPU (Central Processing Unit) 12, a flash memory 13, and a RAM (Random Access Memory) 14. In addition, the PVR 100 includes an operation input unit 15, a graphic control unit 16, a video D/A (Digital/Analog) converter 17, an audio D/A (Digital/Analog) converter 18, and an external interface 19.

The digital tuner 1 selects, under the control of the CPU 12, a specific channel in digital broadcasting via an antenna A, and receives a broadcast signal including data of a program. Although the broadcast signal is, for example, an MPEG stream encoded in MPEG-2 TS (Transport Stream) format, it is not limited to this format. The demodulation unit 2 demodulates the modulated broadcast signal.

The demultiplexer 3 demultiplexes the multiplexed broadcast signal into signals such as a video signal, an audio signal, a closed-caption signal, and an SI (Service Information) signal, and supplies the signals to the decoder 4.

The decoder 4 decodes the video signal, the audio signal, the closed-caption signal, and the SI signal, which are demultiplexed by the demultiplexer 3. The decoded signals are supplied to the recording/reproducing unit 5.

The recording/reproducing unit 5 includes a recording unit 6 and a reproducing unit 7. The recording unit 6 temporarily stores the video signal and the audio signal decoded and input by the decoder 4, and outputs the video signal and the audio signal to the HDD 8 or the optical disc drive 9 for recording while controlling a timing and a data amount thereof. Further, the recording unit 6 is also capable of reading content recorded in the HDD 8 and outputting the content to the optical disc drive 9 so that the optical disc drive 9 records the content on an optical disc 10. The reproducing unit 7 reads the video signal and the audio signal of video content recorded in the HDD 8 or on the optical disc 10, and outputs the video signal and the audio signal to the decoder 4 for reproduction while controlling a timing and a data amount thereof.

The HDD 8 records, in a built-in hard disk, content data such as a program received via the digital tuner 1 (moving image content), various types of moving image content received by the communication unit 11 via the network 50, and moving image data taken by a user. When the stored content is reproduced, the HDD 8 reads the data thereof from the hard disk, and outputs the data to the recording/reproducing unit 5.

Further, there is a case where the HDD 8 stores various programs, other data, and the like. When executed and referred to, the various programs and data are read from the HDD 8 in response to an instruction sent from the CPU 12, and are expanded in the RAM 14. In particular, in this embodiment, the HDD 8 stores thumbnails taken from the moving image content.

Similarly to the HDD 8, the optical disc drive 9 is capable of recording the various types of data such as moving image content on the mounted optical disc 10 and of reading the recorded data. Further, the various programs may be recorded on a portable recording medium such as the optical disc 10 and may be installed through the optical disc drive 9 into the PVR 100. The optical disc 10 includes, for example, a BD (Blu-ray disc), a DVD (Digital Versatile Disc), and a CD (Compact Disc).

The communication unit 11 is a network interface that is connected to the network 50 and is used for exchanging data with a different apparatus on the network 50 according to a protocol such as TCP/IP (Transmission Control Protocol/ Internet Protocol). In the case where data received by the communication unit 11 is multiplexed data, the data is supplied to the demultiplexer 3.

The external interface 19 is, for example, a USB interface, HDMI (High-Definition Multimedia Interface), and a memory card interface. For example, the external interface 19 is connected to a photographing apparatus such as a digital video camera or a digital still camera, or to a memory card, and reads therefrom data of moving images and still images taken by the user.

The CPU 12 accesses the RAM 14 and the like if necessary so as to perform overall control of processing for respective blocks of the PVR 100, such as reproduction processing for moving image content, thumbnail display processing to be described later, and the like.

The flash memory 13 is, for example, a NAND type flash memory serving as a nonvolatile memory in which an OS (Operating System) to be executed by the CPU 12 and firmware including programs, various parameters, and the like are fixedly stored. Further, the flash memory 13 includes software such as a thumbnail display application to be described later, a database of thumbnails of each moving image content item, which is necessary for operation of the software, and the like.

The RAM 14 is used as a work area for the CPU 12. The RAM 14 is a memory for temporarily storing the OS, programs, processed data, and the like during the reproduction processing for moving image content, the thumbnail display processing, and the like.

The operation input unit 15 receives inputs of various setting values and instructions through user's operations such as a fast-forward operation, a rewind operation, and a determination operation from, for example, a remote controller R having a plurality of keys including arrow keys, a determination key, and the like. The operation input unit 15 then outputs the inputs to the CPU 12. As a matter of course, the operation input unit 15 may be constituted of a keyboard and a mouse connected to the PVR 100, switches provided to the PVR 100, and the like, without using the remote controller R.

The graphic control unit 16 performs graphic processing such as OSD (On-screen Display) processing on the video signal output from the decoder 4 or other video data output from the CPU 12, and generates a video signal for displaying on a display D such as a television set (hereinafter, referred to as TV).

The video D/A converter 17 converts a digital video signal input from the graphic control unit 16 into an analog video signal, and then outputs the analog video signal via a video output terminal or the like to the display D.

The audio D/A converter 18 converts a digital audio signal input from the decoder 4 into an analog audio signal, and then outputs the analog audio signal via an audio output terminal or the like to a speaker S of the TV or the like.

[Software Configuration of PVR]

In the case where a user inputs a fast-forward operation or a rewind operation during reproduction of moving image content, the PVR 100 according to this embodiment can display a plurality of thumbnails of the moving image content to be operated.

Figure 2:
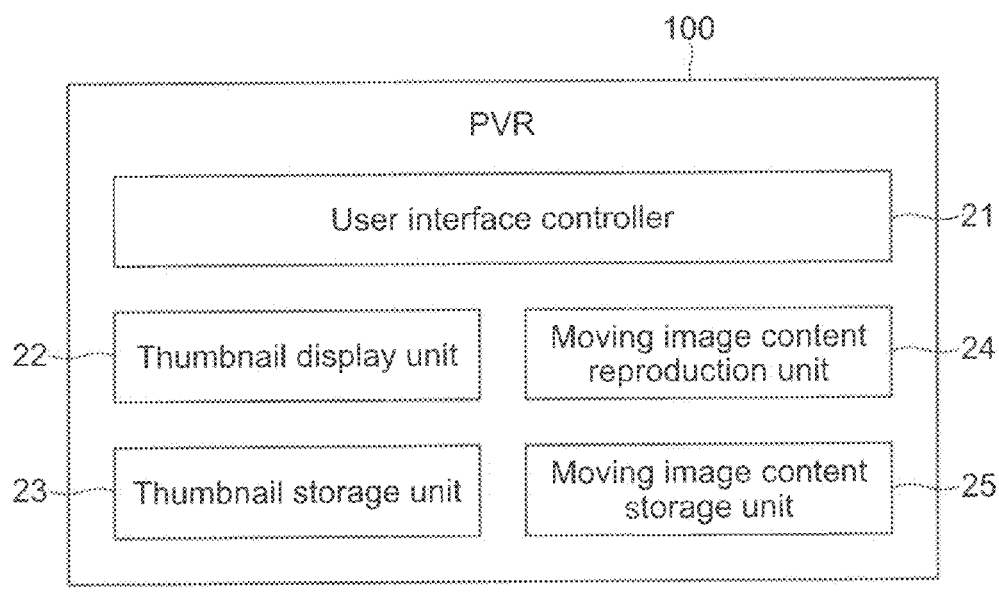
FIG. 2 is a diagram showing functional blocks of software provided to the PVR so as to display thumbnails according to the first embodiment of the present disclosure.

FIG. 2 is a diagram showing functional blocks of software provided to the PVR 100 so as to display thumbnails.

As shown in FIG. 2, the PVR 100 includes functional blocks (software modules) including a user interface controller 21, a thumbnail display unit 22, a thumbnail storage unit 23, a moving image content reproduction unit 24, and a moving image content storage unit 25.

The moving image content storage unit 25 cooperates with the recording unit 6, the HDD 8, and the like to store and manage a plurality of moving image content items. The moving image content reproduction unit 24 cooperates with the reproducing unit 7 and the like to reproduce each moving image content item stored in the moving image content storage unit 25, and outputs the moving image content to the display D.

The thumbnail storage unit 23 cooperates with the flash memory 13 and the like to extract thumbnails (still images) of frames of the moving image content stored in the moving image content storage unit 25 at certain time intervals and then store the thumbnails therein. The certain time interval refers to, for example, a one-second interval, a three-second interval, or a five-second interval, but it is not limited thereto. The thumbnail storage unit 23 may create thumbnails at a timing when moving image content is stored in the HDD 8 or the like, for example, at a scheduled time and day such as a predetermined time of day. Further, depending on the performance of the decoder 4, thumbnails can be referred to directly from the moving image content.

The thumbnail display unit 22 displays, out of the thumbnails stored in the thumbnail storage unit 23, thumbnails corresponding to fast-forward images or rewind images of the reproduced moving image content.

The user interface controller 21 cooperates with the moving image content reproduction unit 24 and the thumbnail display unit 22 to control the display form of the moving image content and the thumbnails read from the moving image content storage unit 25 and the thumbnail storage unit 23, respectively, in accordance with the user's operation.

[Thumbnail Database Structure]

Next, a database of information on thumbnails extracted from the moving image content will be described. FIG. 3 is a diagram showing an example of the database. The database is stored in the flash memory 13, but the database may exist in the outside such as a server on a network.

As shown in FIG. 3, the database includes items of a content ID, a content name, a file name, and a time stamp. The content ID uniquely identifies moving image content items stored in the HDD 8 or the like. For a single content ID, a plurality of thumbnails are stored in a file format of png, gif, jpeg, or the like. Time stamps of frames corresponding to the respective thumbnails are also stored. FIG. 3 shows an example in which each of two moving image content items, "X Park" and "Travel to Y", has a plurality of thumbnails.

The CPU 12 can access the thumbnails of each content item with the content ID and the time stamp as keys, and display information thereof via the user interface controller 21.

[Operation of PVR]

Next, the operation of the PVR 100 structured as described above will be described. In the following description, the CPU 12 of the PVR 100 will be described as a main operating subject. However, operations thereof are performed in cooperation with the above modules executed under the control of the CPU 12.

Figure 4:
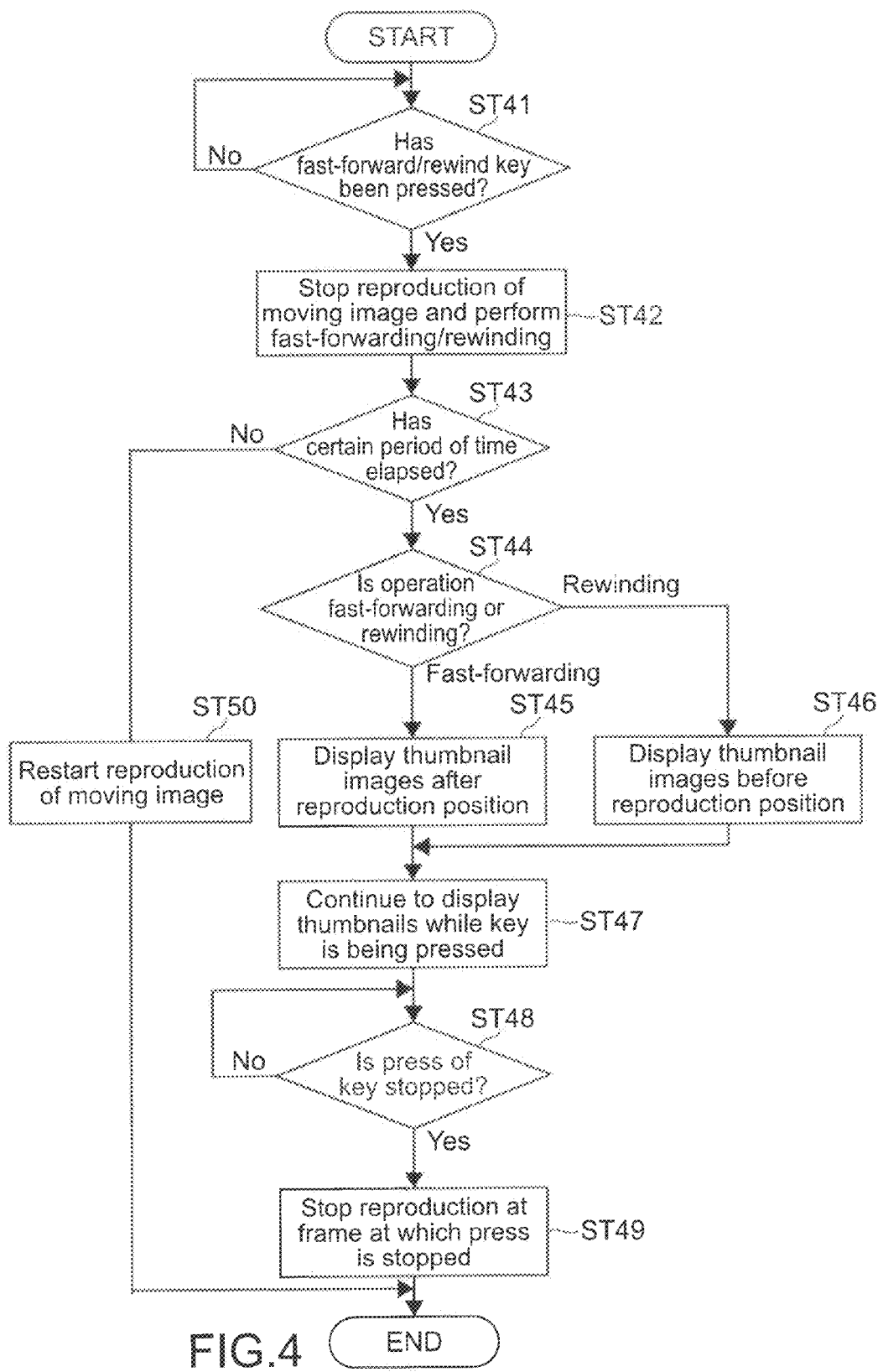
FIG. 4 is a flowchart of operations of the PVR from an input of a fast-forward/rewind operation to the stop thereof during reproduction of moving image content in the first embodiment of the present disclosure.
Figure 5:
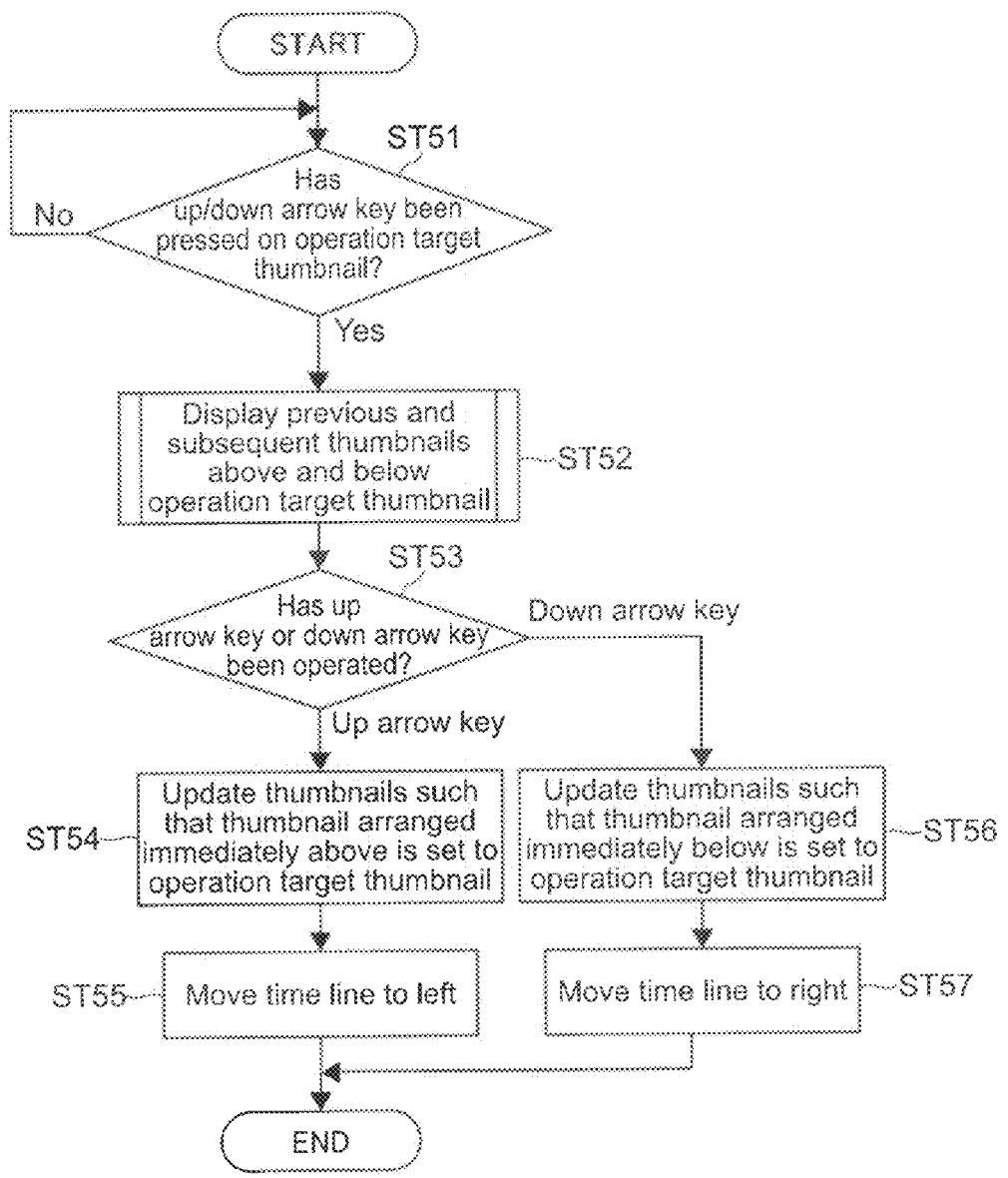
FIG. 5 is a flowchart of operations of the PVR in the case where a predetermined operation is input after the fast-forward/rewind operation is stopped in the first embodiment of the present disclosure.

FIG. 4 is a flowchart of operations of the PVR 100 from an input of a fast-forward/rewind operation to the stop thereof during reproduction of moving image content. Further, FIG. 5 is a flowchart of operations of the PVR 100 in the case where a predetermined operation is input after the fast-forward/rewind operation is stopped. Furthermore, FIG. 8 are diagrams showing a state where thumbnails are displayed on the display D in accordance with the operations of the flowchart.

As shown in FIG. 4, the CPU 12 first determines whether a fast-forward/rewind operation has been input by a user pressing a right/left arrow key of the remote controller R, for example, during reproduction of the moving image content (Step 41). In this embodiment, the left arrow key of the remote controller R corresponds to the rewind operation, and the right arrow key thereof corresponds to the fast-forward operation.

In the case where the fast-forward/rewind operation is detected (Yes in Step 41), the CPU 12 stops reproduction of the moving image content and performs fast-forward or rewind processing of the moving image content (processing of reproducing frames subsequent or previous to the frame of the moving image content at the time when the operation has been input, at a higher speed than a normal reproduction speed) (Step 42).

Figure 8A:
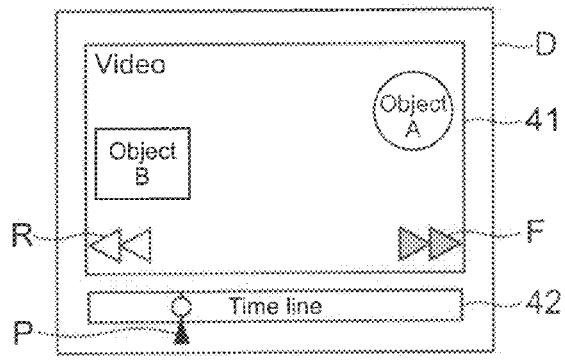
FIG. 8 are diagrams showing a state where thumbnails are displayed on a display in the first embodiment of the present disclosure.

FIG. 8A shows a reproduction screen of the moving image content displayed on the display D, at the time when the fast-forward/rewind operation is input. As shown in FIG. 8A, for example, a video containing an object A and an object B is displayed in a moving image display area 41 of the display D. At the right- and left-side ends of the lower portion of the moving image display area 41, figures F and R indicating fast-forwarding and rewinding states, respectively, are also displayed. FIG. 8A shows a case where a fast-forward operation is input and the figure F is displayed with emphasis. Further, below the moving image display area 41, a time line 42 indicating a current reproduction position with respect to the total reproduction time of the moving image content is also displayed. The time line 42 has a pointer P for indicating the reproduction position.

Referring back to FIG. 4, the CPU 12 subsequently determines whether a certain period of time has elapsed since the detection of the fast-forward/rewind operation (whether the detection of the fast-forward/rewind operation has continued for a certain period of time) (Step 43). Here, the certain period of time refers to about two seconds, for example, but it is not limited thereto.

When determining that the certain period of time has elapsed (Yes in Step 43), the CPU 12 determines whether the operation described above is a fast-forward operation or a rewind operation (Step 44).

When determining that the operation is a fast-forward operation, the CPU 12 arranges and displays a plurality of thumbnails at first time intervals, which include a thumbnail corresponding to a frame of the moving image content being fast-forwarded and thumbnails corresponding to frames subsequent to the frame (Step 45).

When determining that the operation is a rewind operation, the CPU 12 arranges and displays a plurality of thumbnails at the first time intervals, which include a thumbnail corresponding to a frame of the moving image content being rewound and thumbnails corresponding to frames previous to the frame (Step 46).

The first time interval is set to a one-second interval, for example, but it is not limited thereto. Further, the number of thumbnails to be displayed is six, for example, but it is not limited thereto. Furthermore, a direction in which the thumbnails are arranged is a horizontal direction, for example, and a position thereof is a lower portion of the display, for example, but they are not limited to the above.

Figure 8B:
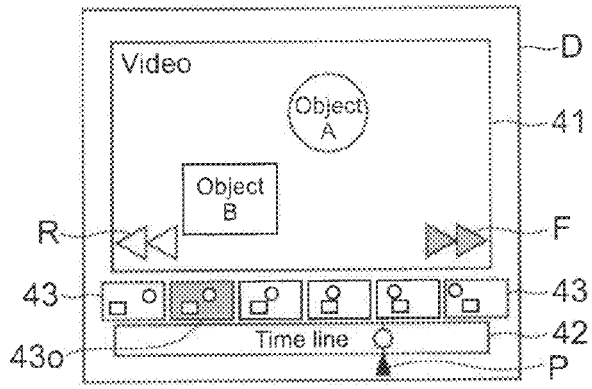

FIG. 8B shows a state of the reproduction screen in the case where a certain period of time has elapsed since the detection of the fast-forward operation. As shown in FIG. 8B, when the certain period of time has elapsed since the detection of the fast-forward operation, for example, six thumbnails (first thumbnails) 43 are arranged for display in a horizontal direction between the moving image display area 41 and the time line 42. At this time, the frame displayed in the moving image display area 41 corresponds to the first thumbnail 43 second from the left, for example, out of the six first thumbnails 43. Hereinafter, the first thumbnail 43 second from the left is referred to as "operation target thumbnail". In the case of the rewind operation, the first thumbnail 43 second from the right is set as an operation target thumbnail.

In this case, the first thumbnails may be displayed so as to gradually move upwardly from the lower end of the display to the position shown in FIG. 8B.

Here, the first thumbnail 43 second from the left (in the case of fast-forward operation) or the first thumbnail 43 second from the right (in the case of rewind operation) is set to the operation target thumbnail. This is because, when second thumbnails to be described later are displayed with reference to the operation target thumbnail, as many first thumbnails 43 as possible can be displayed in a feed direction (forward in fast-forward operation, and backward in rewind operation) without interrupting the video of the moving image content displayed in the moving image display area 41 as much as possible, and fine adjustment is enabled to be made by a movement corresponding to at least one first thumbnail 43 in the back and forth (right and left) directions.

Referring back to FIG. 4, during a time period in which the right/left arrow key for fast-forwarding/rewinding is being pressed, the CPU 12 continues to display the thumbnails (thumbnails after reproduction position in the case of fast-forward operation, and thumbnails before reproduction position in the case of rewind operation) while subsequently updating the thumbnails (Steps 47 and 48).

Then, in the case where the CPU 12 determines that the press of the right/left arrow key is stopped (the press of the right/left arrow key ceases to be detected) (Yes in Step 48), the reproduction of moving image content is suspended at the frame corresponding to the time point when the press is stopped (Step 49). At this time, the first thumbnails 43 are still being displayed. In the case where the press of the determination key (or reproduction key) is detected at this time, the reproduction of the moving image content is restarted from the frame corresponding to the time point when the press is stopped.

Further, in the case where the fast-forward/rewind operation is stopped before the certain period of time has not elapsed in Step 43 (No), the CPU 12 restarts reproduction of the moving image content from the frame corresponding to the time point when the press is stopped (Step 50).

FIG. 5 is a flowchart of operations of the PVR 100 in the case where a predetermined operation is input after the fast-forward/rewind operation is stopped.

As shown in FIG. 5, the CPU 12 determines, in a state where the first thumbnails 43 including the operation target thumbnail 43o are displayed, whether the press of an up/down arrow key of the remote controller R has been detected (Step 51).

In the case where the press of the up/down arrow key is detected (Yes in Step 51), the CPU 12 displays a plurality of thumbnails (second thumbnails) at second time intervals larger than the first time intervals in a vertical direction with reference to the operation target thumbnail 43o (Step 52). The second time interval is, for example, 30 seconds, 1 minute, or the like, but it is not limited thereto.

Figure 8C:
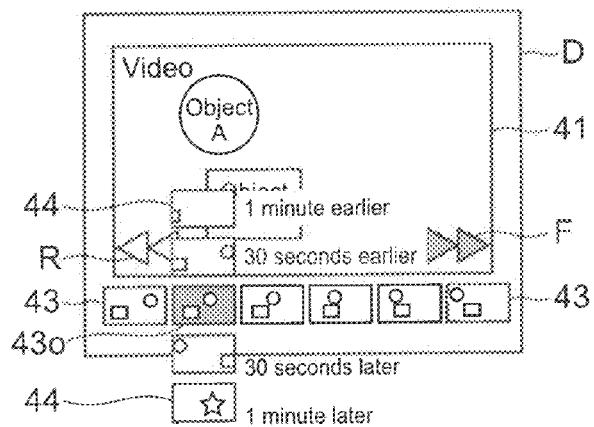

FIG. 8C shows a state of the reproduction screen when the second thumbnails are displayed. As shown in FIG. 8C, a second thumbnail 44 corresponding to a reproduction position 30 seconds earlier is displayed immediately above the operation target thumbnail 43o, and a second thumbnail 44 corresponding to a reproduction position one minute earlier is displayed two above the operation target thumbnail 43o. Similarly, a second thumbnail 44 corresponding to a reproduction position 30 seconds later is displayed immediately below the operation target thumbnail 43o, and a second thumbnail 44 corresponding to a reproduction position one minute later is displayed two below the operation target thumbnail 43o.

In this embodiment, when the second thumbnails 44 are displayed, the time line 42 being displayed until then is hidden, but it may be continuously displayed.

Figure 6:
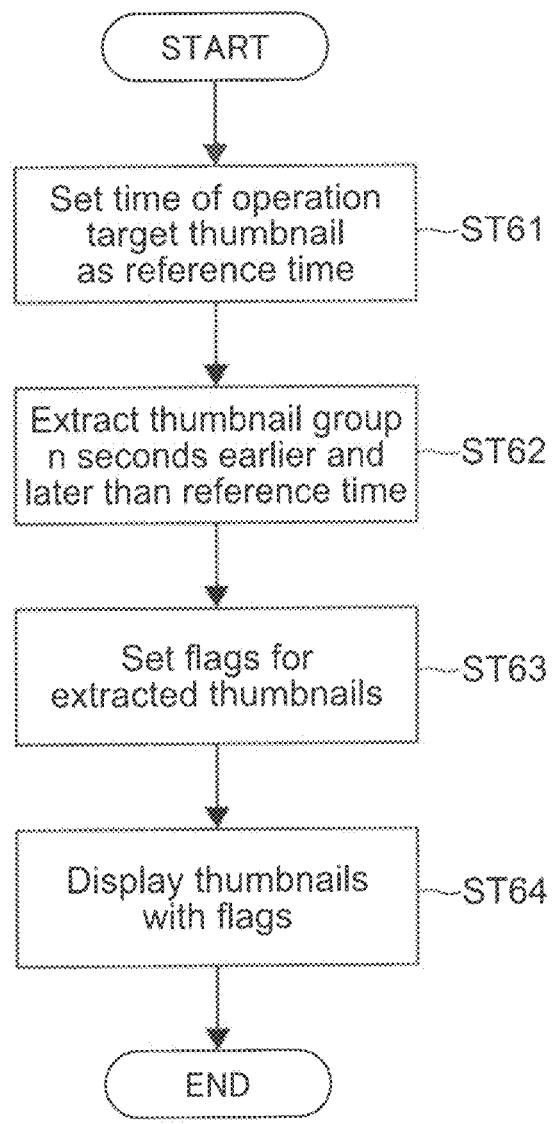
FIG. 6 is a flowchart showing details of second thumbnail display processing in Step 52 of FIG. 5.

FIG. 6 is a flowchart of details of display processing of the second thumbnails 44 in Step 52 described above. Further, FIG. 7 is a diagram showing a state where a database of thumbnails in the processing is referred to.

As shown in FIG. 6, the CPU 12 first sets a reproduction time of the operation target thumbnail 43o as a reference time (Step 61), and subsequently extracts a thumbnail group n seconds earlier and later than the reference time from the database (Step 62). In this embodiment, the number n is 30 and 60, but it is not limited thereto.

Figure 7:
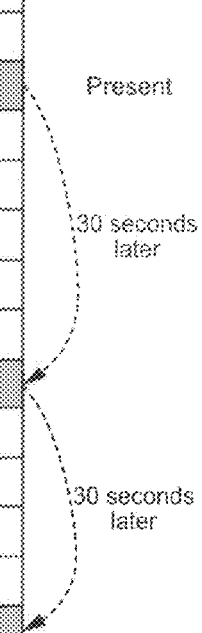

As shown also in FIG. 7, the CPU 12 sets flags for the extracted thumbnails (Step 63) and displays the thumbnails with flags as second thumbnails 44 (Step 64). In this embodiment, since the thumbnails corresponding to the reproduction positions 30 seconds earlier and later and thumbnails corresponding to the reproduction positions one minute earlier and later with reference to the operation target thumbnail 43o are extracted, four flags in total are set in the database shown in FIG. 7.

Referring back to FIG. 5, the CPU 12 subsequently determines whether a press of the up/down arrow key of the remote controller R has been detected in a state where the first thumbnails 43 and the second thumbnails 44 are displayed (Step 53).

When detecting the press of the up arrow key, the CPU 12 updates the second thumbnails 44 such that the second thumbnail 44 arranged immediately above the operation target thumbnail 43*o* before the up arrow key is pressed is set to a new operation target thumbnail 43*o* (Step 54). In accordance with the update, the CPU 12 moves the time line constituted of six first thumbnails 43 in the left direction (Step 55).

Figure 8D:
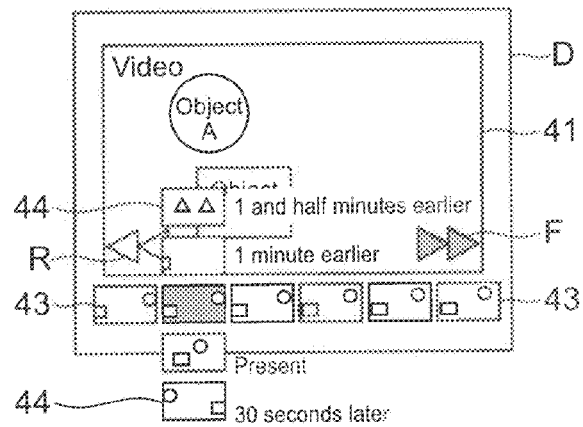

Specifically, as shown in FIG. 8D, when detecting the press of the up arrow key, the CPU 12 shifts the original operation target thumbnail 43*o* and the second thumbnails 43 immediately above, two above, and immediately below the original operation target thumbnail 43*o* downwardly by one time interval, displays a second thumbnail 44 corresponding to a reproduction position one and a half minutes earlier than the original operation target thumbnail 43*o* at the top anew, and removes the second thumbnail 44 corresponding to the reproduction position one minute later. Accordingly, the number of second thumbnails 43 to be displayed is not changed before and after the press of the up arrow key. Accordingly, a second thumbnail corresponding to the reproduction position 30 seconds earlier than the original operation target thumbnail 43*o* is set as a new operation target thumbnail 43*o*, and the moving image content displayed in the moving image display area 41 is also skipped to a frame corresponding to the new operation target thumbnail 43*o*.

At the same time, the CPU 12 changes the time line such that, as the five first thumbnails 43 arranged in the horizontal direction other than the operation target thumbnail 43*o*, thumbnails one second earlier, one second later, two second later, three second later, and four second later are displayed so as to correspond to the updated operation target thumbnail 43*o*. Therefore, the number of first thumbnails 43 to be displayed is not also changed before and after the press of the up arrow key.

For example, when the press of the determination key or reproduction key is detected at this time, the reproduction of the moving image content is restarted from a frame corresponding to the updated operation target thumbnail 43*o*. Further, in the case where the press of the determination key or the like is detected without detection of the press of the up/down arrow key in the state where the second thumbnails 44 are displayed, the reproduction of the moving image content is restarted from a frame corresponding to the operation target thumbnail 43*o* at that time.

Also in the case where the press of the down arrow key is detected in Step 53 of FIG. 5, the same processing is executed in a different direction (Steps 56 and 57). FIG. 9 show a state of the reproduction screen in the case where the press of the down arrow key is detected. In FIG. 9, for convenience of description, a frame of the moving image display area 41, first thumbnails 43, and second thumbnails 44 are denoted by numbers corresponding to the number of seconds that have elapsed from a reproduction start.

Figure 9A:
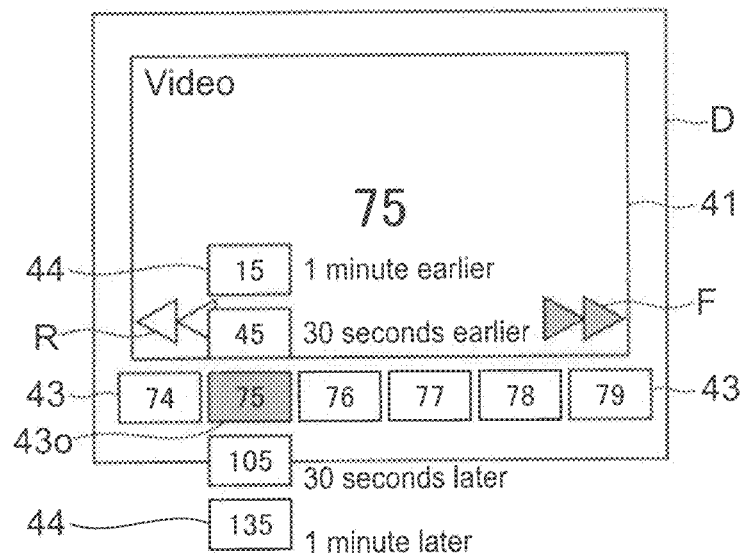
FIG. 9 are diagrams showing a state of a reproduction screen in the case where a press of a down arrow key is detected after second thumbnails are displayed in the first embodiment of the present disclosure.

FIG. 9A shows a state where the reproduction is skipped from the beginning to the 75th second by the fast-forward operation. Further, a thumbnail of a frame at the 75th second is displayed as an operation target thumbnail 43*o*. On both sides of the operation target thumbnail 43*o*, first thumbnails 43 one second earlier and later are displayed. Above and below the operation target thumbnail 43*o*, second thumbnails 44 30 seconds earlier and later and second thumbnails 44 one minute earlier and later are displayed.

Figure 9B:
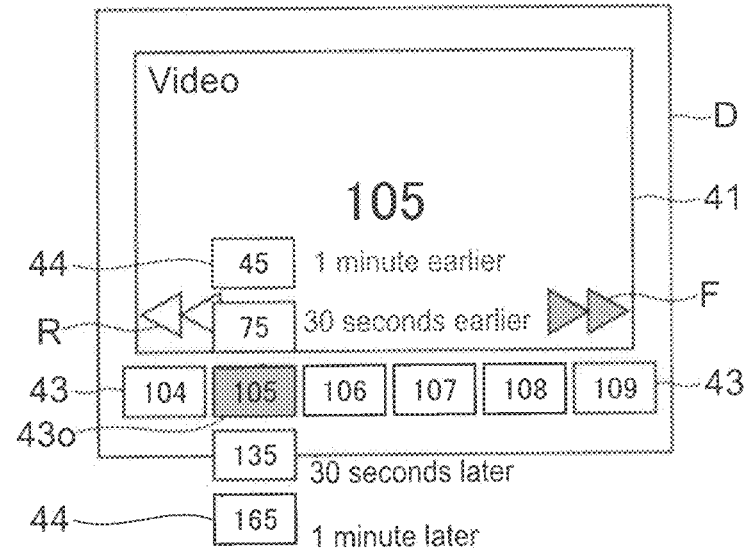

In the case where the press of the down arrow key is detected in this state, as shown in FIG. 9B, the frame of the moving image display area 41 is skipped to a frame 30 seconds later, that is, a frame at the 105th second and the first thumbnails 43 and the second thumbnails 44 are updated accordingly. Here, for example, in the case where the press of the determination key is detected, the reproduction of the moving image content is restarted from the frame at the 105th second.

As described above, in this embodiment, in the case where the fast-forward/rewind operation continues for a certain period of time, the PVR 100 arranges a plurality of first thumbnails 43 in the horizontal direction for sequential display, and in the case where the fast-forward/rewind operation is stopped (and the up/down arrow key is pressed), the PVR 100 arranges second thumbnails 43 in the vertical direction for display with the operation target thumbnail 43*o* of the plurality of first thumbnails 43 as a reference. As a result, the reproduction of a moving image can be restarted from a frame corresponding to each thumbnail. Accordingly, a user can reach a desired scene correctly.

[Variation of Time Interval Between Thumbnails]

Figure 10A:
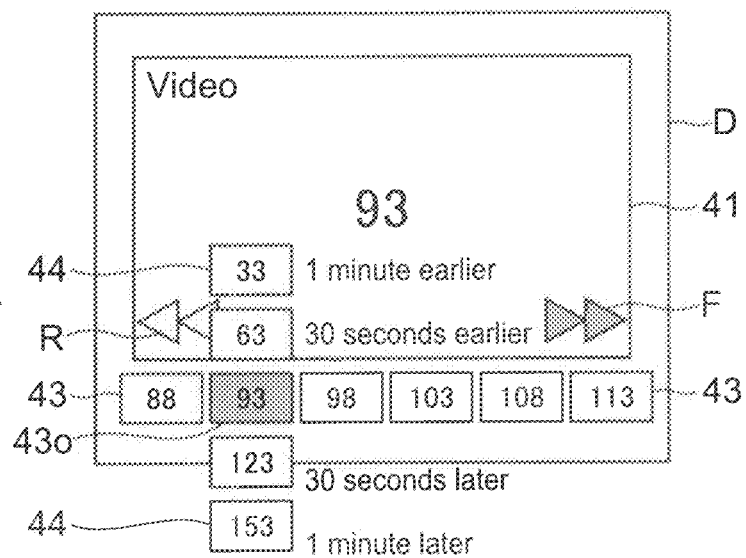
FIG. 10 are diagrams showing an example in which time intervals between the first thumbnails and between the second thumbnails are changed in the first embodiment of the present disclosure.
Figure 10B:
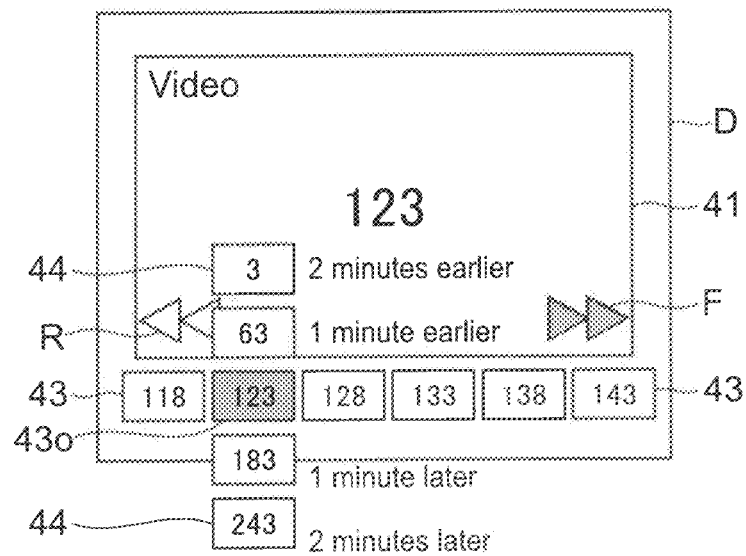

In the above description, the time interval between the first thumbnails 43 is set to one second and the time interval between the second thumbnails 44 is set to 30 seconds, but those time intervals can be changed as appropriate as a matter of course. FIG. 10A shows a case where the time interval between the first thumbnails 43 is set to five seconds, and FIG. 10B shows a case where the time interval between the second thumbnails 44 is set to one minute.

Second Embodiment

Next, as a second embodiment of the present disclosure, a description will be given on an example in which the present disclosure is applied to a mobile terminal. In this embodiment, the parts having the same structure as those of the first embodiment described above will be denoted by the same reference symbols and description thereof will be omitted or simplified.

[Hardware Configuration of Mobile Terminal]

Figure 11:
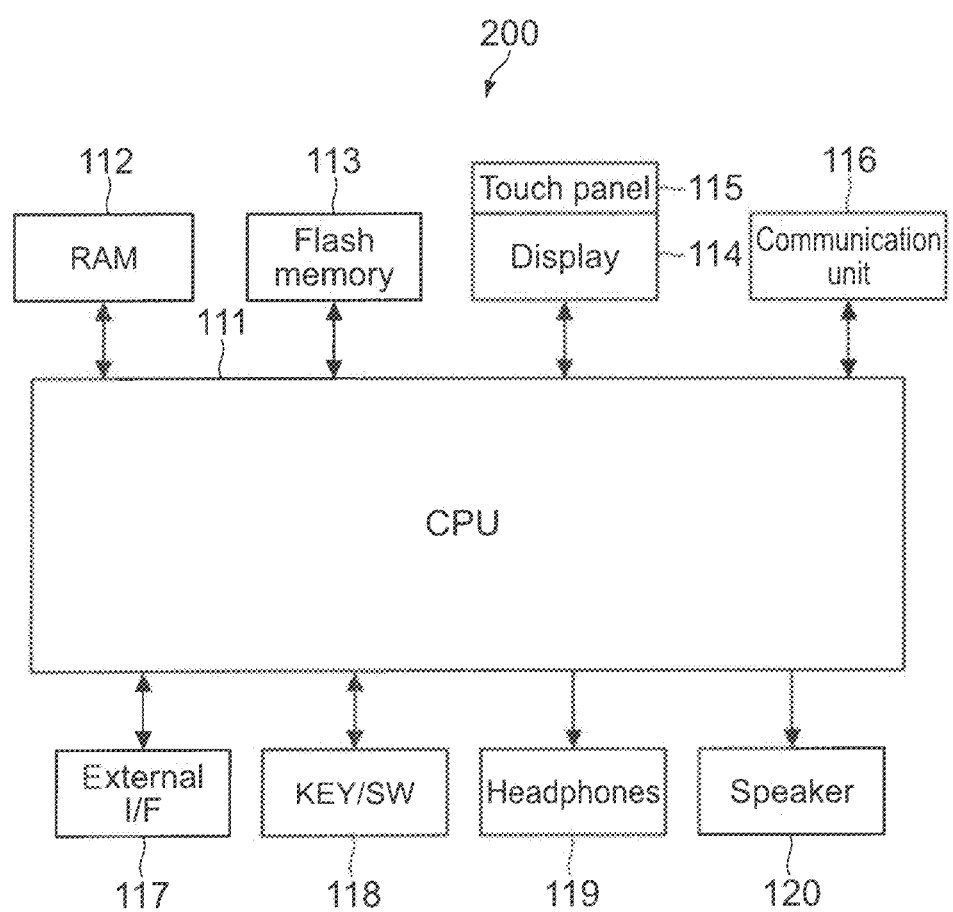
FIG. 11 is a block diagram showing the hardware configuration of a mobile terminal according to a second embodiment of the present disclosure.

FIG. 11 is a block diagram showing the hardware configuration of a mobile terminal according to this embodiment. The mobile terminal is, for example, a mobile phone, a smartphone, a PDA (Personal Digital Assistant), a portable AV player, an electronic book, an electronic dictionary, or the like.

The mobile terminal 200 includes a CPU 111, a RAM 112, a flash memory 113, a display 114, a touch panel 115, a communication unit 116, an external I/F (interface) 117, a key/switch unit 118, headphones 119, and a speaker 120.

The functions of the CPU 111, the RAM 112, the flash memory 113, the communication unit 116, and the external I/F 117 are the same as those of the CPU 12, the RAM 14, the flash memory 13, the communication unit 11, and the external interface 19 shown in FIG. 1 of the first embodiment described above. Further, in the flash memory 113, the moving image content stored in the HDD 8 in the first embodiment described above is also stored.

The display 114 is formed of, for example, an LCD (Liquid Crystal Display) or OELD (Organic Electro-Luminescence Display), and displays reproduced moving image content and thumbnails. Further, the display 114 is integrally provided to the touch panel 115. The touch panel 115 detects user's touch operations such as a fast-forward operation, a rewind operation, and a thumbnail selection operation, and transmits the touch operations to the CPU 111. Regarding an operation system of the touch panel 115, for example, a resistive system or a capacitive system is used, but other systems such as an electromagnetic induction system, a matrix switch system, a surface acoustic wave system, and an infrared ray system may be used. Further, the touch panel 115 is also capable of performing multi-touch detection.

The key/switch unit 118 receives a user's operation or the like that is difficult to be input particularly with the touch panel 115, such as a power switch or a shortcut key. Then, the key/switch unit 118 transmits an input signal to the CPU 111.

The headphones 119 and the speaker 120 output an audio signal of the moving image content stored in the flash memory 113 or the like, or input from the communication unit 116, the external I/F 117, or the like.

[Operation of Mobile Terminal]

Next, a description will be given on the operation of a mobile terminal 200 in this embodiment. In the following description, the CPU 111 of the mobile terminal 200 will be described as a main operating subject. However, operations thereof are performed in cooperation with the above modules shown in FIG. 2, executed under the control of the CPU 111. The mobile terminal 200 according to this embodiment can execute thumbnail selection processing using the touch panel 115, in addition to the same function of the PVR 100 described in the first embodiment. Further, in this embodiment, fast-forward/rewind processing is performed by, for example, a user touching the figure F or R displayed in the moving image display area 41.

(Thumbnail Movement Processing by Drag Operation)

Figure 12A:
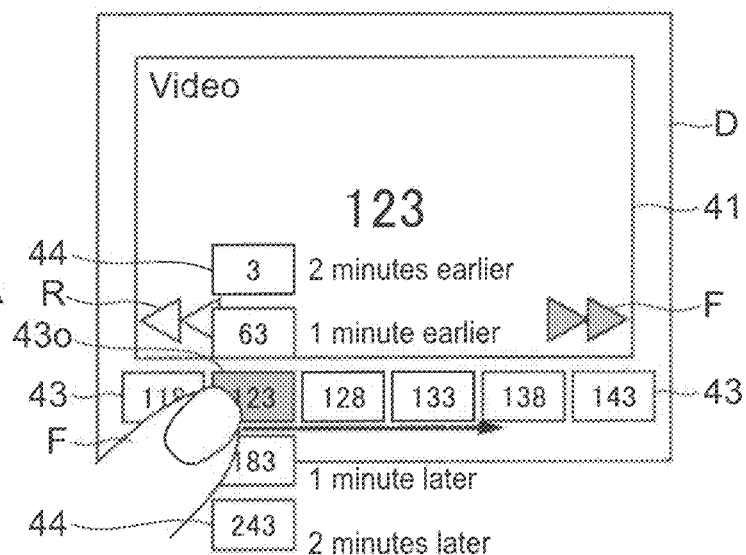
FIG. 12 are diagrams showing a state where a time line of the first thumbnails is moved by a drag operation made by a user in the second embodiment of the present disclosure.

FIG. 12 are diagrams showing a state where a time line of the first thumbnails 43 is moved by a drag operation made by a user's finger. Time intervals between the first thumbnails 43 and between the second thumbnails 44 in FIG. 12A are the same as those shown in FIG. 10B.

Figure 12B:
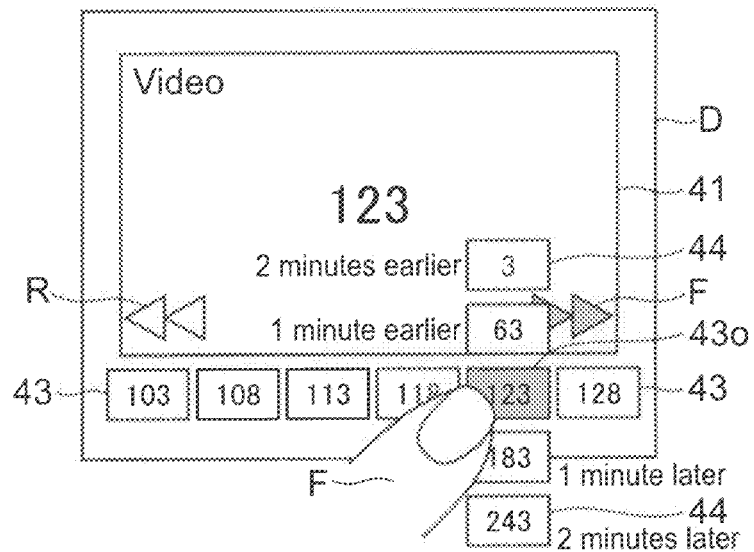

When the user drags the operation target thumbnail 43o (thumbnail at the 123rd second) by the finger in the right direction from the state shown in FIG. 12A, the CPU 111 moves the operation target thumbnail 43o in the right direction in accordance with the drag operation, as shown in FIG. 12B. Simultaneously, the CPU 111 also moves four second thumbnails 44 originally displayed above and below the operation target thumbnail 43o so as to follow the movement. At the same time, the CPU 111 updates the first thumbnails 43 to be set to thumbnails at later reproduction positions in accordance with the movement. Specifically, as shown in FIG. 12B, when the drag operation is executed by a distance corresponding to three first thumbnails 43, the first thumbnails 43 at the 133rd second, the 138th second, and the 143rd second, which have been displayed before the drag operation, are removed and first thumbnails 43 at the 103rd second, the 108th second, and the 113rd second are newly displayed instead.

FIG. 13 are diagrams showing a state where the operation target thumbnail 43o is moved by a drag operation made by a user's finger.

Figure 13A:
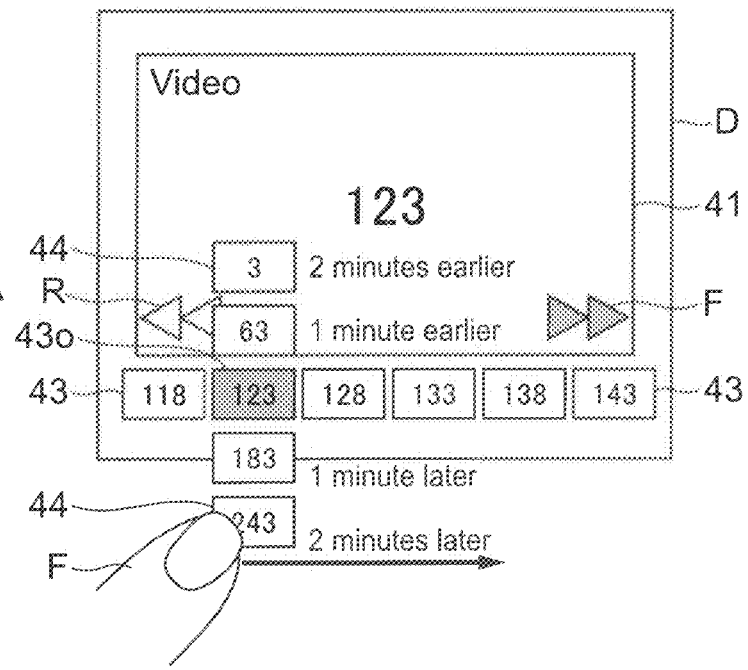
FIG. 13 are diagrams showing a state where an operation target thumbnail is moved by a drag operation made by a user in the second embodiment of the present disclosure.
Figure 13B:
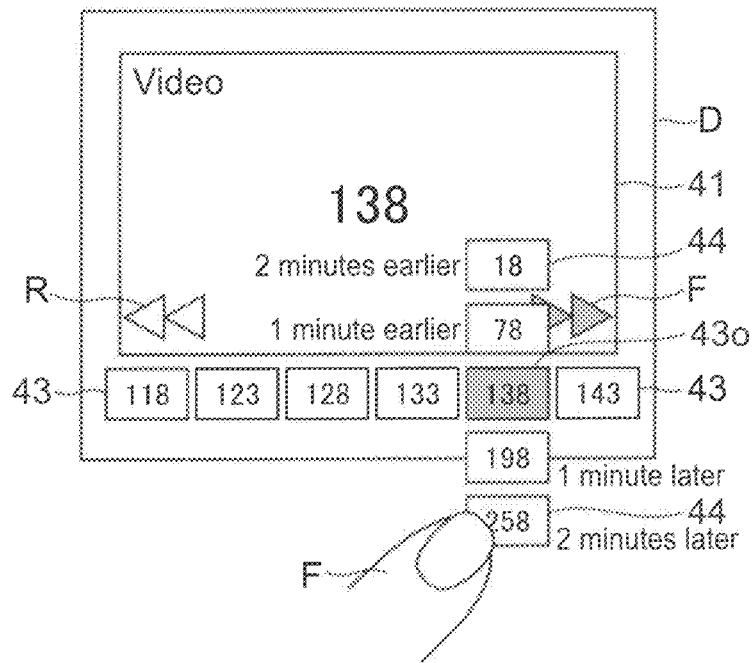

When the user drags any one of the second thumbnails 44 by the finger in the right direction from the state shown in FIG. 13A, the CPU 111 moves the operation target thumbnail 43o in the right direction in accordance with the drag operation while maintaining the time line of the first thumbnails 43, as shown in FIG. 13B. Simultaneously, the CPU 111 updates the second thumbnails 44 above and below the operation target thumbnail 43o to be set to second thumbnails 44 at later reproduction positions in accordance with the moved operation target thumbnail 43o. In FIG. 13B, when the drag operation is executed such that a second thumbnail 44 at the 243rd second is moved in the right direction by a distance corresponding to three first thumbnails 43, the operation target thumbnail 43o is moved from the 123rd second to the 138th second, and the second thumbnails 44 at the 3rd second, the 63rd second, the 183rd second, and the 243rd second, which have been displayed before the drag operation, are updated to be set to second thumbnails 44 at the 18th second, the 78th second, the 198th second, and the 258th second.

Here, it is conceived that by the movement of the operation target thumbnail 43o, the number of seconds for a second thumbnail 44 displayed above the operation target thumbnail 43o is below 0 seconds. In this case, a second thumbnail 44 at the 0 seconds (that is, thumbnail of the starting frame of moving image content) is displayed for convenience.

Through those drag operations, the user can retrieve a desired scene more specifically without performing a new fast-forward/rewind operation.

(Second Thumbnail Display Processing by Pinch Out Operation)

Next, processing of displaying second thumbnails from the state where the first thumbnails 43 are displayed in the mobile terminal 200 according to this embodiment will be described. In the first embodiment, in the case where the fast-forward/rewind operation is stopped and then the up/down arrow key is pressed, the second thumbnails 44 are displayed. In this embodiment, the mobile terminal 200 can display second thumbnails 44 by a pinch out operation made by a user's finger in place of the press of the up/down arrow key.

FIG. 14 are diagrams showing a state where the mobile terminal 200 displays second thumbnails 44 by a pinch out operation made by a user.

Figure 14A:
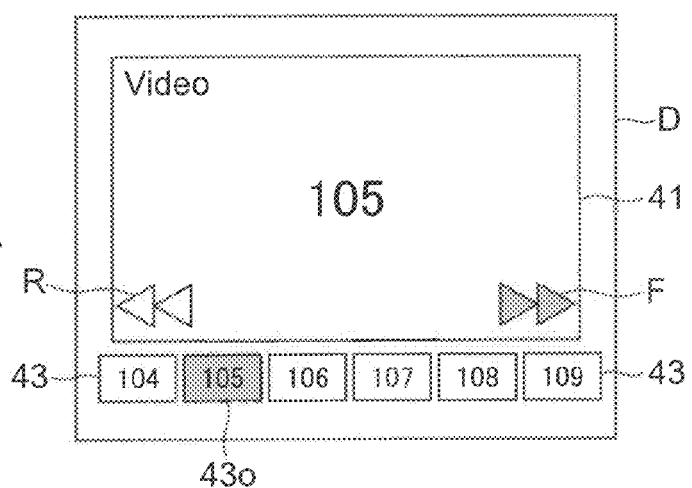
FIG. 14 are diagrams showing a state where second thumbnails are displayed by a pinch out operation made by a user in the second embodiment of the present disclosure.
Figure 14B:
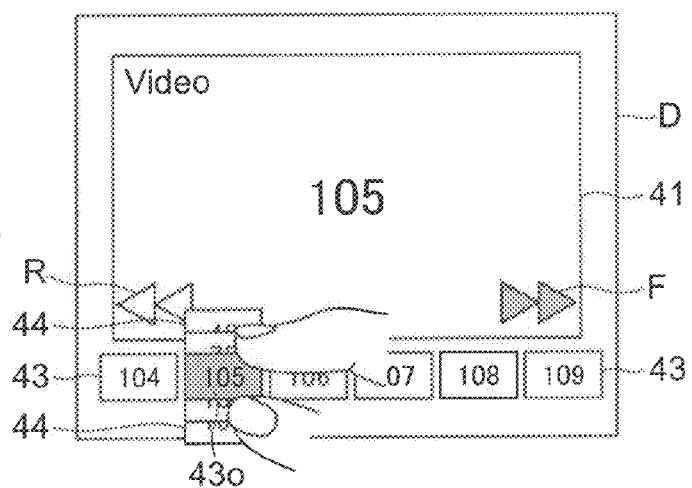
Figure 14C:
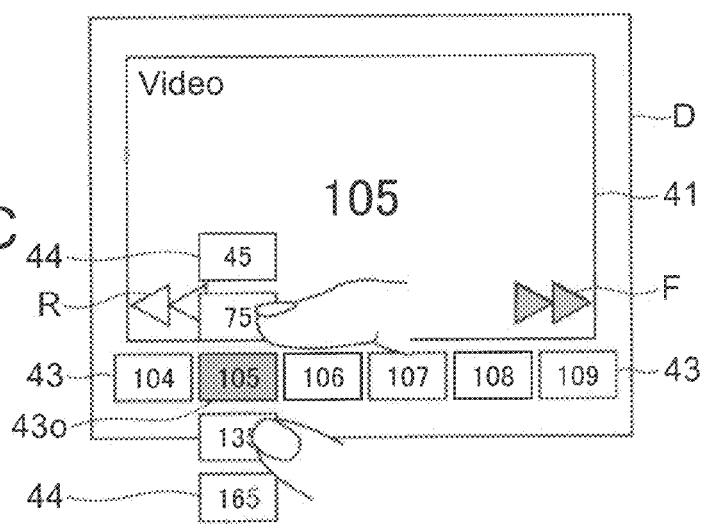

FIG. 14A shows a state where the first thumbnails 43 are displayed and the fast-forward operation is stopped. From this state, as shown in FIGS. 14B and 14C, when the user pinches out the operation target thumbnail 43o by two fingers, the CPU 111 gradually displays second thumbnails 44 30 seconds earlier and later and second thumbnails 44 one minute earlier and later than the operation target thumbnail 43o in accordance with the pinch out operation.

Accordingly, the user can display the second thumbnails 44 by a more intuitive operation. In this case, the operation target thumbnail 43o is not limited to the first thumbnail 43 second from the left. Further, the number of second thumbnails 44 to be displayed may be variable in accordance with the range of the pinch out operation. For example, in the case where the user slightly pinches out the operation target thumbnail 43o and then removes the fingers from the touch panel 115, only the second thumbnails 44 immediately above and below the operation target thumbnail 43o may be displayed.

Modified Example

The present disclosure is not limited to the embodiments described above and may be variously modified without departing from the gist of the present disclosure.

Figure 15:
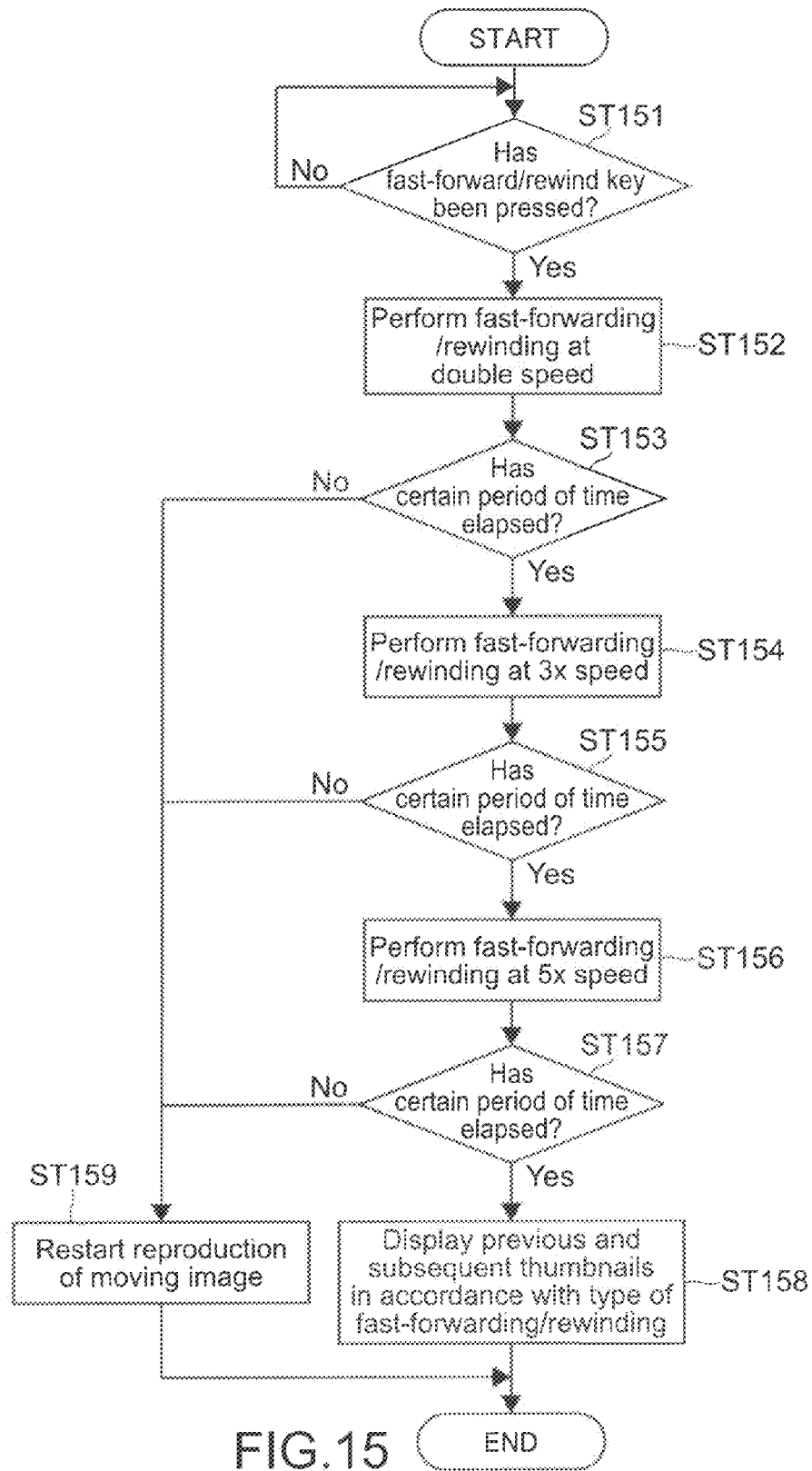
FIG. 15 is a flowchart of operations of first thumbnail display processing when a fast-forward/rewind speed is changed in a modified example of the present disclosure.

In the embodiments described above, the fast-forward/rewind speed is constant. However, even in the case where the fast-forward/rewind speed is variable, thumbnails can be displayed. FIG. 15 is a flowchart of operations when the PVR 100 changes a fast-forward/rewind speed and displays thumbnails. In this example, the PVR 100 is configured to raise the speed as the length of time during which a fast-forward/rewind key (right/left arrow key) is pressed becomes longer. However, for example, also in the case where the speed is raised every time a fast-forward/rewind key is pressed or where different keys are prepared for different multiples of the fast-forward/rewind speed, the same processing is applicable. Further, although the maximum speed is 5× speed in this example, the reproduction may be performed at a higher speed than the 5× speed.

As shown in FIG. 15, upon detection of a fast-forward/rewind operation (Yes in Step 151), the CPU 12 first performs fast-forward/rewind processing of the moving image content at double speed (Step 152).

Subsequently, the CPU 12 determines whether a certain period of time (for example, about five seconds) has elapsed since the detection of the fast-forward/rewind operation (whether the fast-forward/rewind operation continues for a certain period of time) (Step 153).

When determining that the certain period of time has elapsed (Yes in Step 153), the CPU 12 performs the fast-forward/rewind processing of the moving image content at 3× speed (Step 154).

Similarly, when another certain period of time has elapsed (Yes in Step 155), the CPU 12 performs the fast-forward/rewind processing of the moving image content at 5× speed (Step 156).

Then, when still another certain period of time has elapsed (Yes in Step 157), the CPU 12 displays, in accordance with the fast-forward operation or the rewind operation, first thumbnails 43 of frames including the frame of the moving image content being fast-forwarded or rewound and frames previous and subsequent to the frame, as in the case described in the first embodiment described above (Step 158).

After that, in the case where the up/down arrow key is operated, for example, the CPU 12 displays second thumbnails 44 as in the case of the first embodiment described above.

On the other hand, in the case where the certain period of time has not elapsed and the fast-forward/rewind operation is stopped in Steps 153, 155, and 157, the CPU 12 restarts reproduction of the moving image content from that time point (Step 159).

As described above, the CPU 12 displays the first thumbnails 43 only after the fast-forward speed or the rewind speed has reached the maximum speed, with the result that frames that are hardly followed by user's eyes can be recognized by the user as thumbnails even in high-speed search, and a scene desired by the user can be retrieved.

In the embodiments described above, as described with reference to FIG. 5, the second thumbnails 43 arranged in the vertical direction are displayed in the case where the press of the fast-forward/rewind button is stopped and the up/down arrow key is pressed on the operation target thumbnail 43o. However, the PVR 100 may automatically display the second thumbnails 43 at the time when the press of the fast-forward/rewind button is stopped without waiting for an operation of the up/down arrow key to the operation target thumbnail 43o.

Further, in the embodiments described above, the second thumbnails 44 are displayed after the first thumbnails 43 are displayed and the fast-forward/rewind operation is stopped. However, before the fast-forward/rewind operation is stopped, the second thumbnails 44 may be displayed simultaneously with or after the display of the first thumbnails 43. In this case, when the fast-forward/rewind speed reaches a predetermined multiple of the speed, the second thumbnails 44 may be displayed. In addition, the number of second thumbnails 44 to be displayed may be increased as the fast-forward/rewind speed becomes faster. For example, at the normal speed (double speed), only the first thumbnails 43 may be displayed, at 3× speed, the second thumbnails 44 immediately above and below the operation target thumbnail 43o may be displayed, and at 5× speed, the second thumbnails 44 two above and below the operation target thumbnail 43o may also be displayed.

In the embodiments described above, the first thumbnails 43 are displayed in the horizontal direction and the second thumbnails 43 are displayed in the vertical direction, but the display direction of those thumbnails is not limited to the above. Further, for example, the first thumbnails 43 may be displayed in the vertical direction and the second thumbnails 43 may be displayed in the horizontal direction. In this case, if the remote controller R is used for operation, a fast-forward/rewind operation may be input with use of the up/down arrow key, and an operation with respect to the second thumbnails 43 may be input with use of the left/right arrow key. Further, the position where the first thumbnails 43 and the second thumbnails 43 are displayed is not limited to the lower portion of the display, and the first thumbnails 43 and the second thumbnails 43 may be displayed in an upper portion or right or left portion thereof.

In the embodiments described above, the moving image content is stored in the HDD 8 of the PVR 100 or the flash memory 113 of the mobile terminal 200, but the moving image content may be stored on an external network of the PVR 100 or the mobile terminal 200. In other words, the moving image content may be reproduced by streaming from a sever on the network, for example. Also in this case, thumbnails are displayed in accordance with the fast-forward/rewind operation performed on the moving image content to be reproduced by streaming, as in the case of the embodiments described above.

The processing shown in FIGS. 12 and 13 in the second embodiment has been described as the processing operated by the user's finger in the mobile terminal 200 having a touch panel. However, the processing can similarly be executed in an information processing apparatus without touch panel, with use of a pointing device capable of performing a drag operation, such as a mouse or a touchpad.

In the embodiments described above, the present disclosure is applied to the PVR and the mobile terminal as an example. However, the present disclosure may also be applicable to, for example, a laptop PC, a desktop PC, a tablet PC, a server apparatus, a digital still camera, a digital video camera, a television apparatus, a game console, a car navigation apparatus, a moving image recording and reproducing apparatus for a monitoring camera (network camera), and other information processing apparatuses.

This application claims the benefit of priority under 35 U.S.C. §119 to JP 2010-272929 filed in the Japan Patent Office on Dec. 7, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a processor configured to reproduce video data; and
an interface configured to receive an instruction to perform a fast forward operation or a rewind operation on the reproduced video data, wherein
the processor is configured to
determine whether a first predetermined period of time has elapsed since receiving the instruction;
control the display to display the reproduced video data when the time elapsed since receiving the instruction is less than the first predetermined period of time; and
control the display to display the reproduced video data together with a first line of thumbnail images each corresponding to a frame of the video data selected at a first time interval when the time elapsed since receiving the instruction is greater than the first predetermined period of time, and subsequently control the display to display a second line of thumbnail images each corresponding to a frame of the video data selected at a second time interval together with the reproduced video data and the first line of thumbnail images.

2. The information processing apparatus of claim 1, wherein the processor is configured to control the display to display the first line of thumbnail images horizontally on the display.

3. The information processing apparatus of claim 1, wherein the processor is configured to control the display to display the second line of thumbnail images vertically on the display.

4. The information processing apparatus of claim 1, wherein the processor is configured to control the display to display the first line of thumbnail images and second line of thumbnail images perpendicular to one another.

5. The information processing apparatus of claim 1, wherein a middle thumbnail image of the second line of thumbnail images and a thumbnail image of the first line of thumbnail images is the same.

6. The information processing apparatus of claim 1, wherein the second time interval is greater than the first time interval.

7. The information processing apparatus of claim 1, wherein the first and second lines of thumbnail images include a common thumbnail image corresponding to a current reproduction position of the video data.

8. The information processing apparatus of claim 1, wherein the interface is configured to receive a selection corresponding to a thumbnail displayed in the first line of thumbnail images, and the processor changes the reproduction position of the video data to the position corresponding to the selected thumbnail.

9. The information processing apparatus of claim 1, wherein the interface is configured to receive a selection corresponding to a thumbnail displayed in the second line of thumbnail images, and the processor changes the reproduction position of the video data to the position corresponding to the selected thumbnail.

10. The information processing apparatus of claim 1, wherein the processor is configured to control the display to display the first line of thumbnail images after continuously receiving the instruction for the first predetermined period of time.

11. The information processing apparatus of claim 10, wherein the processor is configured to control the display to display the second line of thumbnail images when the instruction is no longer continuously received.

12. The information processing apparatus of claim 1, wherein the processor is configured to increase a fast forward or rewind speed of the reproduced video data while the instruction is continuously detected, and the processor is configured to control the display to display a first line of thumbnail images when the fast forward or rewind speed of the reproduced video data reaches a predetermined speed.

13. The information processing apparatus of claim 1, wherein the processor is configured to control the display to display the second line of thumbnail images when another instruction is received at the user interface.

14. The information processing apparatus of claim 13, wherein the another instruction is an instruction corresponding to one of the thumbnail images displayed in the first line of thumbnail images.

15. The information processing apparatus of claim 1, wherein the interface is configured to receive an input selecting a thumbnail displayed in the first line of thumbnail images, and the processor controls the display to display the second line of thumbnail images originating from the selected thumbnail in the first line of thumbnail images.

16. The information processing apparatus of claim 1, wherein the interface is configured to receive an input to shift the first line of thumbnail images in first or second direction, the first direction corresponding to a rewind operation of the reproduced video data and the second direction corresponding to a fast forward operation of the reproduced video data.

17. The information processing apparatus of claim 16, wherein the processor is configured to control the display to update the thumbnail images displayed in the first and second lines of thumbnail images based on the received input.

18. The information processing apparatus of claim 1, wherein the interface is a touch-panel interface.

19. The information processing apparatus of claim 18, wherein the touch panel interface is configured to receive an input selecting a thumbnail displayed in the first line of thumbnail images, and the processor is configured to control the display to display the second line of thumbnail images originating from the selected thumbnail in the first line of thumbnail images.

20. An information processing method performed by an information processing apparatus, the method comprising:
   reproducing video data by a processor of the information processing apparatus;
   receiving, at an interface of the information processing apparatus, an instruction to perform a fast forward operation or a rewind operation on the reproduced video data;
   determining, by the processor, whether a first predetermined period of time has elapsed since receiving the instruction;
   controlling, by the processor, the display to display the reproduced video data when the time elapsed since receiving the instruction is less than the first predetermined period of time; and
   controlling, by the processor, the display to display the reproduced video data together with a first line of thumbnail images each corresponding to a frame of the video data selected at a first time interval when the time elapsed since receiving the instruction is greater than the first predetermined period of time, and subsequently controlling the display to display a second line of thumbnail images each corresponding to a frame of the video data selected at a second time interval together with the reproduced vide data and the first line of thumbnail images.

21. A non-transitory computer-readable medium including computer program instructions, which when executed by an information processing apparatus, cause the information processing apparatus to perform a method comprising:
   reproducing video data;
   receiving an instruction to perform a fast forward operation or a rewind operation on the reproduced video data;
   determining whether a first predetermined period of time has elapsed since receiving the instruction;
   controlling the display to display the reproduced video data when the time elapsed since receiving the instruction is less than the first predetermined period of time; and
   controlling the display to display the reproduced video data together with a first line of thumbnail images each corresponding to a frame of the video data selected at a first time interval when the time elapsed since receiving the instruction is greater than the first predetermined period of time, and subsequently controlling the display to display a second line of thumbnail images each corresponding to a frame of the video data selected at a second time interval together with the reproduced vide data and the first line of thumbnail images.

* * * * *